United States Patent
Baudel et al.

(10) Patent No.: US 10,423,517 B2
(45) Date of Patent: *Sep. 24, 2019

(54) ASSERTIONS IN A BUSINESS RULE MANAGEMENT SYSTEM

(71) Applicant: International Business Machines Corporation, Armonk, NY (US)

(72) Inventors: Thomas Baudel, Paris (FR); Nicolas Sauterey, Paris (FR)

(73) Assignee: International Business Machines Corporation, Armonk, NY (US)

( * ) Notice: Subject to any disclaimer, the term of this patent is extended or adjusted under 35 U.S.C. 154(b) by 95 days.

This patent is subject to a terminal disclaimer.

(21) Appl. No.: 15/610,591

(22) Filed: May 31, 2017

(65) Prior Publication Data

US 2017/0270025 A1  Sep. 21, 2017

Related U.S. Application Data

(63) Continuation of application No. 13/282,338, filed on Oct. 26, 2011, now Pat. No. 9,710,356.

(30) Foreign Application Priority Data

Sep. 19, 2011  (EP) .................................... 11290421

(51) Int. Cl.
  *G06F 11/36*  (2006.01)
  *G06F 9/445*  (2018.01)

(52) U.S. Cl.
  CPC ...... *G06F 11/3612* (2013.01); *G06F 9/44521* (2013.01)

(58) Field of Classification Search
  CPC .......................................................... G06F 11/36
  USPC ....................................................... 714/38.1
  See application file for complete search history.

(56) References Cited

U.S. PATENT DOCUMENTS

| | | | |
|---|---|---|---|
| 8,140,779 B2 * | 3/2012 | Topham | G06F 3/0607 711/154 |
| 8,185,916 B2 | 5/2012 | Toussaint et al. | |
| 8,756,392 B2 * | 6/2014 | Matsui | G06F 3/0608 711/117 |
| 2007/0022411 A1 | 1/2007 | Tromey | |
| 2008/0216147 A1 * | 9/2008 | Duffy | G06F 21/645 726/1 |
| 2009/0006167 A1 | 1/2009 | Toussaint et al. | |
| 2010/0083233 A1 * | 4/2010 | Vanoverberghe | G06F 11/3612 717/126 |
| 2011/0246969 A1 | 10/2011 | Lee et al. | |
| 2012/0167054 A1 | 6/2012 | Liu et al. | |

(Continued)

*Primary Examiner* — Kamini B Patel
(74) *Attorney, Agent, or Firm* — Steven M. Greenberg, Esq.; Shutts & Bowen LLP

(57) ABSTRACT

Embodiments of the present invention provide a method, system and computer program product for assertion management in a dynamically assembled programmatic environment. In an embodiment of the invention, a method for assertion management in a dynamically assembled programmatic environment can include dynamically assembling different execution units into a dynamically assembled computer program, applying an assertion to at least one of the different execution units through an introspection of the one of the different execution units, and generating an assertion result reporting a failure of the assertion responsive to the failure of the assertion.

20 Claims, 2 Drawing Sheets

(56) References Cited

U.S. PATENT DOCUMENTS

| | | | |
|---|---|---|---|
| 2012/0179650 A1 | 7/2012 | Vechev et al. | |
| 2012/0278791 A1* | 11/2012 | Geist | G06F 11/362 |
| | | | 717/125 |
| 2012/0290963 A1* | 11/2012 | Moll | G06Q 10/063 |
| | | | 715/771 |
| 2012/0304010 A1 | 11/2012 | Opstad et al. | |
| 2012/0317506 A1* | 12/2012 | Zhao | G06F 3/14 |
| | | | 715/764 |
| 2012/0317543 A1* | 12/2012 | Baudel | G06F 8/33 |
| | | | 717/105 |
| 2013/0073909 A1* | 3/2013 | Baudel | G06F 9/44521 |
| | | | 714/38.1 |

* cited by examiner

ASSERTIONS IN A BUSINESS RULE MANAGEMENT SYSTEM

CROSS-REFERENCE TO RELATED APPLICATIONS

This application is a Continuation of U.S. patent application Ser. No. 13/282,338, filed Oct. 26, 2011, the entirety of which is incorporated herein by reference.

BACKGROUND OF THE INVENTION

Field of the Invention

The present invention relates to the run-time assurance of programmatic conditions in a computer program and more particularly to a programmatic assertion.

Description of the Related Art

A business rule management system (BRMS) is a software system used to define, deploy, execute, monitor and maintain the variety and complexity of decision logic that is used by operational systems within an organization or enterprise. The decision logic, namely "business rules", includes policies, requirements, and conditional statements that are used to determine the operational actions that take place in applications and systems. At the minimum, a BRMS includes a repository, allowing decision logic to be externalized from core application code, tools that allow both technical developers and business experts to define and manage decision logic, and a runtime environment in which applications can invoke decision logic managed within the BRMS and execute the decision logic using a business rules engine.

The use of a BRMS has been found to reduce or remove reliance on information technology (IT) departments for changes in live systems. The use of a BRMS also has been found to provide increased control over implemented decision logic for compliance and better business management, and also the ability to express decision logic with increased precision, using a business vocabulary syntax and graphical rule representations such as decision tables, trees, scorecards and flows. Finally, the use of a BRMS has been found to improve efficiency of processes through increased decision automation.

In a BRMS, like traditional middleware, multiple different users can contribute modules of application logic, for instance, to enforce a business policy, automate a process, instantiate a transaction or produce a tangible result. These modules, referred to in the art as "execution units", are dynamically assembled by middleware software components and executed to form a single enterprise application program. Because of the shared authorship of the execution units, undesirable incompatibilities, redundancy or logical faults can be difficult to detect and eliminate. Such faults include undesirable properties of the input or the output of a particular task, particular guarantees that the dynamically assembled task will possess some specific structure (for instance, that it contains at least one execution unit, or at most a given number), or, a posteriori, guarantee that its execution has followed some desired paths.

In regular programming languages, assertions are one of the common practical mechanisms for achieving defect detection at runtime. Assertions usually are limited to verifying input and output properties in that because program source code is statically defined, assertions on its structure and execution paths would be ineffective and impractical to define and maintain. Analogously, in database management, database triggers are used to implement consistency checks and error corrections. Specifically, when some database management actions are performed on a database, specific execution units—namely the triggers—may be executed to either check the data or take further corrective actions when a transaction displays undesirable properties. However, the presence of multiple triggers on a given database action may in fact raise further issues when trying to check the proper structure of the code that is executed and its execution path.

BRIEF SUMMARY OF THE INVENTION

Embodiments of the present invention address deficiencies of the art in respect to defect detection in a computer program dynamically arranged from different execution units and provide a novel and non-obvious method, system and computer program product for assertion management in a dynamically assembled programmatic environment. In an embodiment of the invention, a method for assertion management in a rule-based/execution unit-based programmatic environment can include dynamically assembling different execution units into a dynamically assembled computer program, defining an assertion to one of the different execution units through an introspection of the one of the different execution units, and generating an assertion result reporting a failure of the assertion responsive to the failure of the assertion.

In one aspect of the embodiment, the method further includes applying a different assertion to a list of execution units in a trace log of execution of the execution units in the list. In this regard, in another aspect of the embodiment, the method can include creating an instance of a data model for the dynamically assembled computer program and adding the trace log as an object in the instance of the data model. Of note, the assertion can itself be an execution unit. Further, the different execution units can be executable rules in a BRMS. In particular, the assertion can be a rule applicable by the BRMS. Finally, the assertion can assert either a predicate condition of execution of the one of the different execution units, or a post-condition of execution of the one of the different execution units.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for assertion management in a dynamically assembled programmatic environment. In accordance with an embodiment of the invention, different execution units can be selected for arrangement in a dynamically composed computer program, for example within a BRMS. Once selected for arrangement, the execution units can be configured for introspection and one or more predicate assertions can be applied to selected ones of the execution units. A failure of one or more of the assertions can be written to memory. The execution units can be executed, and each execution can be referenced in a trace of execution for the dynamically composed computer program. Subsequently, one or more post-execution assertions can be applied to selected ones of the execution units and, as before, a failure of one or more of the assertions can be written to memory. Optionally, one or more of the past-execution assertions can be applied to the trace—particularly assertions relating to the identity, number or ordering of execution units executing in the dynamically composed computer program.

Figure 1:
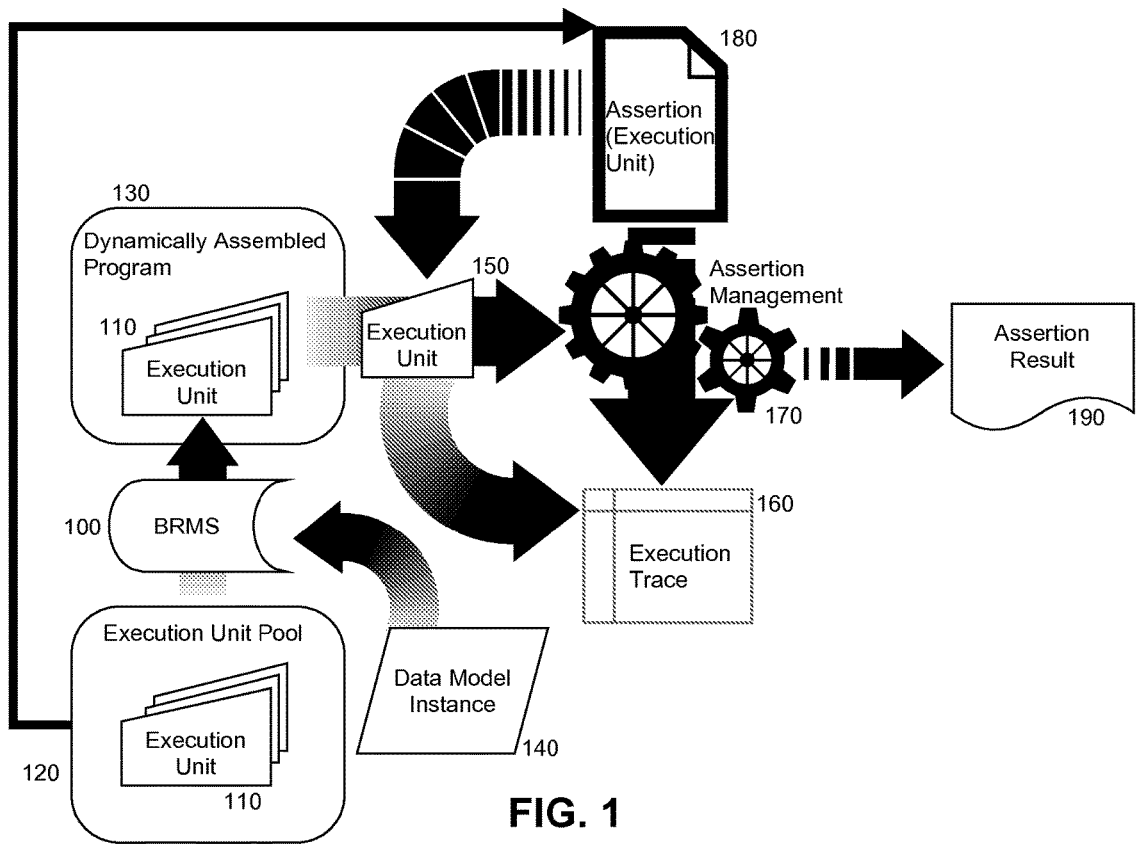
FIG. 1 is a pictorial illustration of a process for assertion management in a dynamically assembled programmatic environment.

In further illustration, FIG. 1 pictorially shows a process for assertion management in a dynamically assembled programmatic environment. As shown in FIG. 1, a BRMS 100 can select a set of execution units 110 in a pool of execution units 120 for dynamic arrangement in a dynamically assembled program 130. A data model instance 140 can be created in memory for the dynamically assembled program 130 and an execution trace 160 of the execution units 110 can be provided within the data model instance 140. Assertion management logic 170 can apply one or more assertions 180 predicate to the execution of the execution units 110, and also one or more assertions 180 as a post condition to the execution of the execution units 110. Of note, the assertions 180 in of themselves can be execution units 110 selectable by the BRMS 100. Further, optionally, one or more assertions 180 can be applied as a post condition to the execution of the execution units 110 with respect to entries in the execution trace 160. A failure of any of the assertions 180 can be reflected in an assertion result 190 written to memory.

Figure 2:
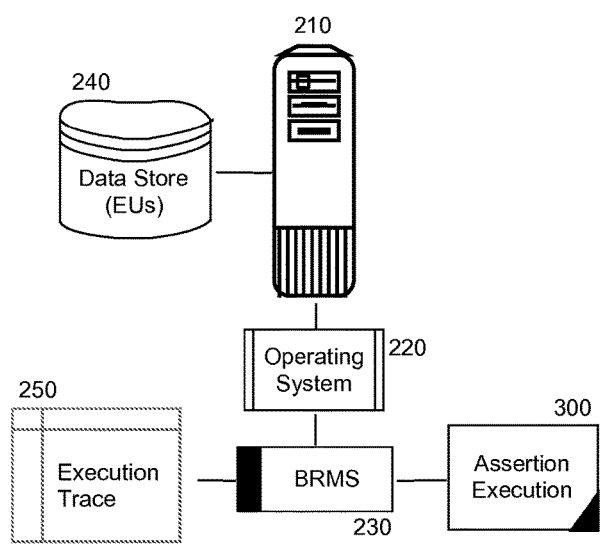
FIG. 2 is a schematic illustration of a dynamic application assembly data processing system configured for assertion management; and, FIG. 3 is a flow chart illustrating a process for assertion management in a dynamically assembled programmatic environment.

The process described in connection with FIG. 1 can be implemented within a dynamic application assembly data processing system. In yet further illustration, FIG. 2 schematically shows a dynamic application assembly data processing system configured for assertion management. The system can include a host server 210 with at least one processor and memory supporting the execution of an operating system 220. The operating system 220 in turn can host the operation of a BRMS 230. The BRMS 230 can be configured to select one or more execution units in a data store of execution units 240 for dynamically assembly into a computer program and subsequent execution. Further, an execution trace 250 can be maintained for the execution of the execution units and can indicate the identity, number and order of execution of the execution units by the BRMS 230.

Importantly, assertion execution module 300 can be coupled to the BRMS 230. The assertion execution module 300 can include program code enabled to apply one or more assertions predicate to the execution of the execution units by the BRMS 230, and also one or more assertions as a post condition to the execution of the execution units. Of note, the assertions in of themselves can be execution units disposed within the data store of the execution units 240 selectable by the BRMS 230. More particularly, the execution units reflective of assertions can be rules applicable by the BRMS 230. Further, optionally, the program code of the module 300 can be enabled to apply one or more assertions as a post condition to the execution of the execution units with respect to entries in the execution trace 250. Finally, the program code of the module 300 can be enabled to generate in memory an assertion result reflecting any failure of any of the assertions.

Figure 3:
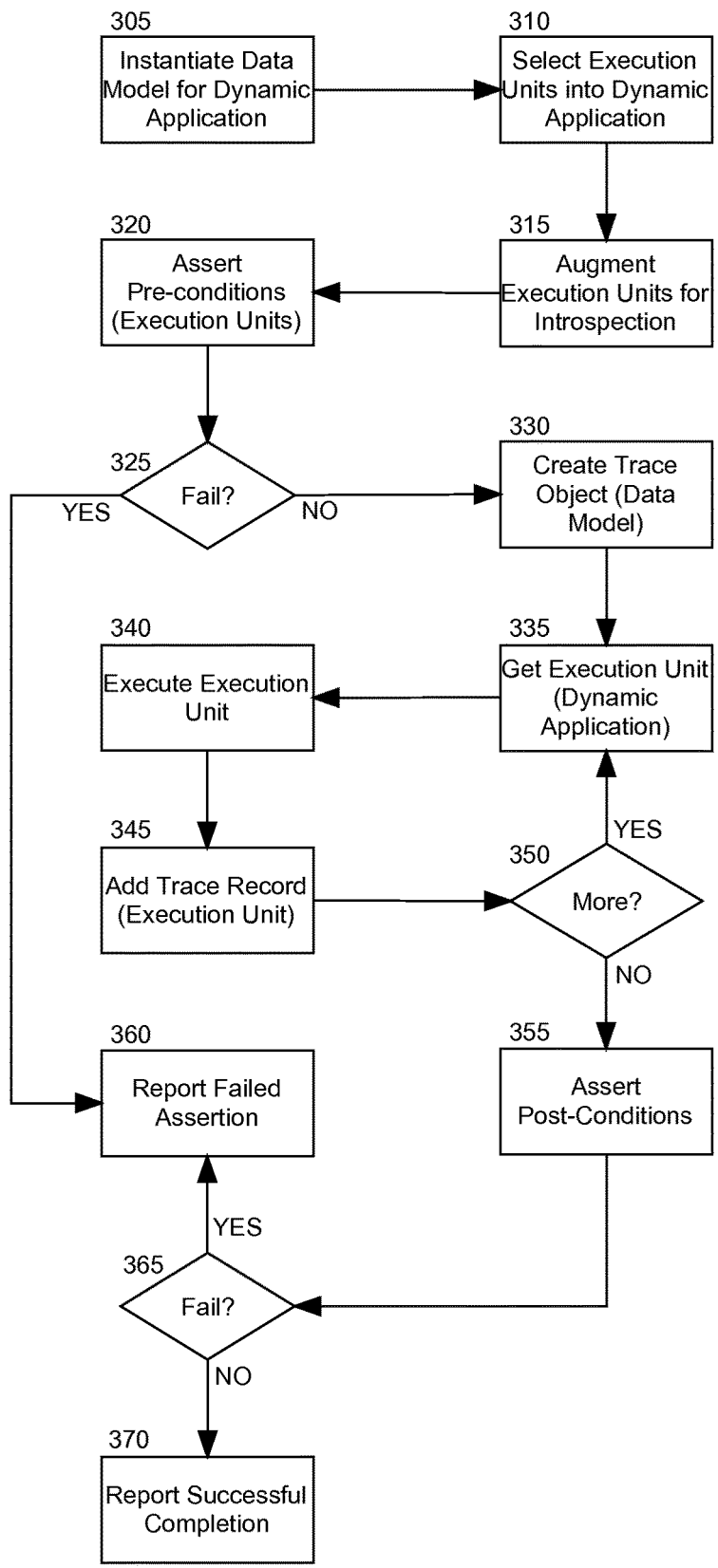

In even yet further illustration of the operation of the program code of the assertion execution module 300, FIG. 3 is a flow chart illustrating a process for assertion management in a dynamically assembled programmatic environment. Beginning in block 305, an instance of a data model can be created in memory for a dynamically assembled application. In block 310, different execution units can be selected for assembly into the dynamically assembled application and one or more of the selected execution units can be configured for introspection in block 315. Of note, in block 320 one or more pre-conditions to the execution of the execution units can be asserted and in decision block 325, if any of the assertions fail, in block 360 the failed assertions can be reported. Otherwise, the process can continue through block 330.

In block 330, a trace data object can be created for inclusion in the data model instance and in block 335 a first of the selected execution units can be retrieved for execution and the retrieved execution can be executed in block 340. In block 345 a record of the retrieved execution unit can be written to the trace object and in decision block 350, it can be determined if additional execution units remain to be processed amongst the selected execution units. If so, the process can repeat in block 335 with the retrieval of another of the selected execution units for execution. Otherwise, the process can continue through block 355.

In block 355, one or more post-condition assertions can be applied to one or more of the different selected execution units. Optionally, one or more post-condition assertions can be applied to the trace object. In decision block 365, if any of the assertions fail, in block 360 the failed assertions can be reported. Otherwise, in block 370 the successful completion of execution of the selected execution units in the dynamically assembled program can be reported.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for assertion management in a dynamically assembled programmatic environment, the method comprising:

dynamically assembling different execution units into a dynamically assembled computer program of an instance of a data model;

augmenting the assembled different execution units for introspection;

applying a predicate assertion as a pre-condition to execution of at least one of the different execution units through an introspection of the one of the different execution units; and, on condition that the pre-condition fails, generating an assertion result reporting a failure of the predicate assertion but otherwise on condition that the pre-condition does not fail, generating an assertion result reporting a success of the predicate assertion.

2. The method of claim 1, further comprising applying a different assertion to a list of execution units in a trace log of execution of the execution units in the list.

3. The method of claim 2, further comprising:

creating an instance of a data model for the dynamically assembled computer program; and, adding the trace log as an object in the instance of the data model.

4. The method of claim 1, wherein the assertion is included as part of an execution unit.

5. The method of claim 1, wherein the different execution units are executable rules in a business rules management system (BRMS).

6. The method of claim 5, wherein the predicate assertion is a rule applicable by the BRMS.

7. The method of claim 1, wherein the assertion asserts either a predicate condition of execution of the one of the different execution units, or a post-condition of execution of the one of the different execution units.

8. A dynamic application assembly data processing system configured for assertion management, the system comprising:

a host server with at least one processor and memory;

a plurality of execution units disposed in a data store of execution units;

a business rules management system (BRMS) executing in the memory of the host server and selecting different ones of the execution units for dynamic assembly into a dynamic application of an instance of a data model; and, an assertion execution module coupled to the BRMS, the module comprising program code enabled to augment the assembled different execution units for introspection, apply a predicate assertion as a pre-condition to execution of at least one of the different execution units through an introspection of the one of the different execution units and on condition that the pre-condition fails, to generate an assertion result reporting a failure of the predicate assertion but otherwise on condition that the pre-condition does not fail, to generate an assertion result reporting a success of the predicate assertion.

9. The system of claim 8, further comprising a trace log maintained by the BRMS to which the program code applies a different assertion to a list of execution units in the trace log.

10. The system of claim 9, wherein the program code of the module is further enabled to create an instance of a data model for the dynamically assembled computer program and to add the trace log as an object in the instance of the data model.

11. The system of claim 8, wherein the predicate assertion is included as part of an execution unit.

12. The system of claim 8, wherein the different execution units comprise executable rules in the BRMS.

13. The system of claim 12, wherein the predicate assertion is a rule applicable by the BRMS.

14. The system of claim 8, wherein the program code of the module is further enabled to:

apply a post-execution assertion to at least one of the different execution units through an introspection of the one of the different execution units; and, generate a new assertion result reporting a failure of the post-execution assertion responsive to the failure of the post-execution assertion.

15. A computer program product for assertion management in a dynamically assembled programmatic environment, the computer program product comprising:

a non-transitory computer readable storage medium comprising a memory device having computer readable program code embodied therewith, wherein the computer readable storage medium is not a transitory signal per se, the computer readable program code comprising:

computer readable program code for dynamically assembling different execution units into a dynamically assembled computer program of an instance of a data model;

computer readable program code for augmenting the assembled different execution units for introspection;

computer readable program code for applying a predicate assertion as a pre-condition to execution of at least one of the different execution units through an introspection of the one of the different execution units; and, computer readable program code for, on condition that the pre-condition fails, generating an assertion result reporting a failure of the predicate assertion but otherwise on condition that the pre-condition does not fail, generating an assertion result reporting a success of the predicate assertion.

16. The computer program product of claim 15, further comprising computer readable program code for applying a predicate assertion as a pre-condition to execution of at least one of the different execution units through an introspection of the one of the different execution units, and on condition that the pre-condition fails, generating an assertion result reporting a failure of the predicate assertion, and applying a different assertion to a list of execution units in a trace log of execution of the execution units in the list.

17. The computer program product of claim 16, further comprising:

computer readable program code for creating an instance of a data model for the dynamically assembled computer program; and, computer readable program code for adding the trace log as an object in the instance of the data model.

18. The computer program product of claim 16, wherein the predicate assertion is included as part of an execution unit.

19. The computer program product of claim 16, wherein the predicate assertion is a rule applicable by the BRMS.

20. The computer program product of claim 16, wherein the assertion asserts either a predicate condition of execution of the one of the different execution units, or a post-condition of execution of the one of the different execution units.

* * * * *